US007670262B2

(12) United States Patent
Minaki et al.

(10) Patent No.: US 7,670,262 B2
(45) Date of Patent: Mar. 2, 2010

(54) CONTROL DEVICE AND CONTROL METHOD FOR AUTOMATIC TRANSMISSION

(75) Inventors: Shun Minaki, Toyota (JP); Koji Oshima, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 118 days.

(21) Appl. No.: 12/109,428

(22) Filed: Apr. 25, 2008

(65) Prior Publication Data
US 2008/0269013 A1 Oct. 30, 2008

(30) Foreign Application Priority Data
Apr. 26, 2007 (JP) ............... 2007-116823

(51) Int. Cl.
*B60W 10/02* (2006.01)
(52) U.S. Cl. ............ 477/180; 477/86; 477/171
(58) Field of Classification Search ........... 477/86, 477/171–174, 180
See application file for complete search history.

(56) References Cited
U.S. PATENT DOCUMENTS 4,515,257 A * 5/1985 Takano et al. ............... 477/39
4,696,380 A * 9/1987 Kita ........................... 192/221
6,102,831 A * 8/2000 Wakahara et al. ........... 477/169

FOREIGN PATENT DOCUMENTS

| JP | 2-72268 A | 3/1990 |
|---|---|---|
| JP | 5-141526 A | 6/1993 |
| JP | 6-94122 A | 4/1994 |
| JP | 6-337064 A | 12/1994 |
| JP | 7-305748 A | 11/1995 |
| JP | 10-252880 A | 9/1998 |
| JP | 10299890 A | * 11/1998 |
| JP | 11-247988 A | 9/1999 |
| JP | 2003-166632 A | 6/2003 |
| JP | 2004-116563 A | 4/2004 |
| JP | 2006-105318 A | 4/2006 |

* cited by examiner

*Primary Examiner*—Ha D. Ho
(74) *Attorney, Agent, or Firm*—Sughrue Mion, PLLC

(57) ABSTRACT

"Threshold A is substituted in a power-on state, "threshold B", which is lower than "threshold A", is substituted in a power-off state, and "threshold C", which is lower than "threshold B" is substituted during a brake operation, as a rapid deceleration determination threshold. The rotational speed of an output shaft of an automatic transmission and the rapid deceleration determination threshold are compared to determine whether a vehicle is rapidly decelerating. The engagement state of a lock-up clutch is controlled based on whether the vehicle is rapidly decelerating.

5 Claims, 6 Drawing Sheets

ENGAGE LOCK-UP CLUTCH

DISENGAGE LOCK-UP CLUTCH

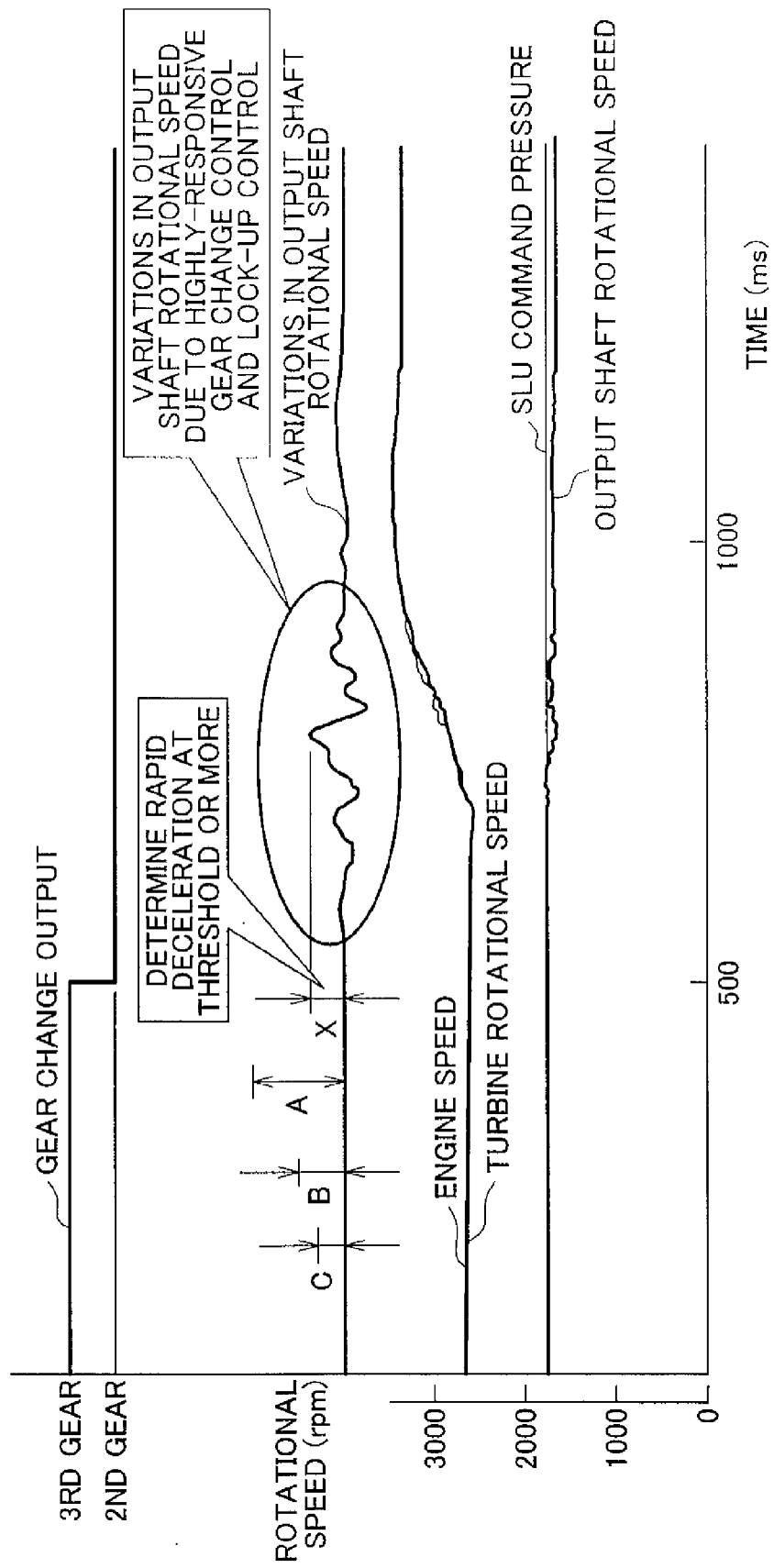

CONTROL DEVICE AND CONTROL METHOD FOR AUTOMATIC TRANSMISSION

INCORPORATION BY REFERENCE

The disclosure of Japanese Patent Application No. 2007-116823 filed on Apr. 26, 2007 including the specification, drawings and abstract is incorporated herein by reference in its entirety.

BACKGROUND OF THE INVENTION

1. Field of the Invention

The present invention relates to a control device and a control method for an automatic transmission that determine whether the vehicle is rapidly decelerating to avoid unnecessary disengagement of a lock-up clutch.

2. Description of the Related Art

Conventionally, a rapid deceleration detection device detects rapid deceleration of a vehicle, a pulse signal in sync with rotation of an output shaft of a transmission is input at first, and the lapse time from the reception of a preceding pulse signal to the reception of a next pulse signal is measured, and the vehicle speed of a predetermined time ago and the time are used to detect rapid deceleration. In addition, a pulse signal in sync with rotation of the output shaft of the transmission is input, the lapse time from the reception of a preceding pulse signal to the present, where a pulse signal is not yet received, is measured, and reduction in the vehicle speed is forecast to detect rapid deceleration even before the reception of a next pulse signal. When rapid deceleration is detected in either of these two ways, the rapid deceleration detection device determines that the vehicle is rapidly decelerating (see Japanese Patent Application Publication No. 2004-116563 (JP-A-2004-116563), for example).

This eliminates the need to wait for the input of a next pulse signal in order to determine the vehicle speed, and allows quick determination of rapid deceleration of the vehicle when waiting a pulse signal at that moment when the vehicle is traveling at a low speed where the frequency of pulses from a rotation sensor is low, thus allowing a lock-up clutch to be disengaged in order to prevent engine stall.

In the rapid deceleration detection device for a vehicle of the above related art, however, rapid deceleration is determined mechanically according to variations in the rotational speed of the output rotary shaft to disengage the lock-up clutch. Therefore, rapid deceleration may be determined in the event of temporary variations in the output rotational speed to unintentionally disengage the lock-up clutch. During highly-responsive gear change control during which determinations for control are made in short periods, for example, rapid deceleration may be determined according to temporary variations in the output rotational speed due to sudden variations in the engine speed, which unintentionally disengages the lock-up clutch.

SUMMARY OF THE INVENTION

The present invention provides an automatic transmission control device and a method of controlling an automatic transmission that selectively use a plurality of thresholds to determine whether the vehicle is rapidly decelerating based on the running conditions to prevent inappropriately determining that the vehicle is rapidly decelerating during highly-responsive gear change control in which the determination control is performed for a short period of time.

A first aspect of the present invention provides (1) a control device for an automatic transmission, including: a deceleration rate detection device that detects a rate of deceleration of a vehicle; a rapid deceleration determination device that determines that the vehicle is rapidly decelerating if the detected rate of deceleration is equal to or exceeds a predetermined threshold; an accelerator operation detection device that detects an accelerator operation; and a threshold setting device that sets a first threshold if a power-on state, in which operation of the accelerator is detected, is determined, and that sets a second threshold, which is lower than the first threshold, if a power-on state is not determined, wherein the rapid deceleration determination device determines that the vehicle is rapidly decelerating if the detected rate of deceleration is equal to or exceeds the threshold set by the threshold setting device.

According to this configuration, different thresholds are used to determine the rate of deceleration. For example, when the vehicle is in the power-on state, it is determined that the vehicle is rapidly decelerating if the rate of deceleration is equal to exceeds the first threshold, and if the vehicle is in the power-off state it is determined that the vehicle is rapidly decelerating if the rate of deceleration is equal to or exceeds the second threshold, which is lower than the first threshold. Therefore, the control may be consistent with driver's intention, and it is possible to avoid inappropriately determining that the vehicle is rapidly decelerating, by changing the rapid deceleration determination threshold in accordance with the running conditions.

The first aspect of the present invention may also provide the automatic transmission control device in accordance with (1) above, (2) that further includes: a fluid joint that transmits a rotational force of an output shaft of the engine to an input shaft for rotation of a gear change mechanism that changes a gear ratio; and an engagement control device that engages the output shaft with the input shaft through an engagement device either directly or with predetermined slip, in which while engaging the output shaft of the engine with the input shaft of the gear change mechanism, the engagement control device disengages the engagement device only when the rapid deceleration determination device determines that the vehicle is rapidly decelerating.

According to this configuration, because the engagement state of the engagement device is controlled in accordance with whether the vehicle is rapidly decelerating, the engagement device may be actuated in accordance with vehicle running conditions, and inappropriate disengagement of the engagement device may be avoided so as to be consistent with driver's intention.

The first aspect of the present invention may further provide an automatic transmission control device in accordance with (1) or (2) above, (3) further including: a brake operation detection device that detects a brake operation, wherein the threshold setting device sets a third threshold, which is lower than the second threshold, when a brake operation is detected by the brake operation detection device.

According to this configuration, because the third threshold, which is lower than the second threshold, is used to determine whether the vehicle is rapidly decelerating when a brake operation is detected, different thresholds are used to determine the rate of deceleration according to whether a brake operation has been performed, as well as whether the vehicle is in the power-on state or in the power-off state. Therefore, the operation of the brakes, which is highly likely during rapid deceleration, is connected to the determination. That is, it is possible to determine whether the vehicle is rapidly decelerating based on smaller variations in the rate of deceleration of the vehicle when the brake is operated, which is highly likely if the vehicle is rapidly decelerating, thereby allowing rapid deceleration of the vehicle to be determined more precisely.

The first aspect of the present invention may further provide the automatic transmission control device in accordance with any one of (1) to (3) above, in which (4) the accelerator operation detection device detects the magnitude of an accelerator depression force; the threshold setting device changes the first threshold in accordance with the detected magnitude of the accelerator depression force when it is determined that the vehicle is in a power-on state; and the rapid deceleration determination device determines that the vehicle is rapidly decelerating according to the changed first threshold.

According to this configuration, because the threshold for determining that the vehicle is rapidly decelerating changes in accordance with the magnitude of the accelerator depression force, it is possible to determine whether the vehicle is rapidly decelerating more precisely according to running conditions The first aspect of the present invention may further provide the automatic transmission control device in accordance with (3) or (4) above, in which (5) the brake operation detection device detects the magnitude of a brake depression force; the threshold setting device changes the third threshold in accordance with the detected magnitude of the brake depression force when a brake operation is detected; and the rapid deceleration determination device determines whether the vehicle is rapidly decelerating based on the changed third threshold.

According to this configuration, because the threshold for determining that the vehicle is rapidly decelerating changes in accordance with the magnitude of the brake depression force, it is possible to determine whether the vehicle is rapidly decelerating more precisely based on a brake operation which is highly likely to be connected with rapid deceleration.

A second aspect of the present invention provides an automatic transmission control device, including; a deceleration rate detection device that detects a rate of deceleration of a vehicle; a rapid deceleration determination device that determines that the vehicle is rapidly decelerating if the detected rate of deceleration is equal to or exceeds a predetermined threshold; a brake operation detection device that detects a brake operation; and a threshold setting device that sets a first threshold if a brake operation is not detected by the brake operation detection device, and that sets a second threshold, which is lower than the first threshold, if a brake operation is detected by the brake operation detection device, wherein the rapid deceleration determination device determines that the vehicle is rapidly decelerating if the rate of deceleration detected by the deceleration rate detection device is equal to or exceeds the threshold value set by the threshold setting device.

A third aspect of the present invention provides a control method of controlling an automatic transmission control device. The control method, includes: detecting a rate of deceleration of a vehicle; detecting an accelerator operation for the vehicle; setting a first threshold if it is determined to be a power-on state in which an accelerator operation is detected, and setting a second threshold, which is lower than the first threshold, if it is not determined to be a power-on state; and determining that the vehicle is rapidly decelerating if the detected rate of deceleration equals or exceeds the set threshold.

A fourth aspect of the present invention provides a control method of controlling an automatic transmission control device. The control method, includes: detecting a rate of deceleration of a vehicle; detecting a brake operation for the vehicle; setting a first threshold if a brake operation is not detected, and setting a second threshold, which is lower than the first threshold, if a brake operation is detected; and determining that the vehicle is rapidly decelerating if the detected rate of deceleration is equal to or exceeds the set threshold.

According to the aspects of the present invention, different thresholds are used to determine the rate of deceleration in accordance with whether the vehicle is in the power-on state, by determining whether the vehicle is rapidly decelerating using a first threshold if the vehicle is moving in the power-on state, and determining whether the vehicle is rapidly decelerating using a second threshold, which is lower than the first threshold, if the vehicle is moving in the power-off state. Therefore, a control device for an automatic transmission is provided that changes the rapid deceleration determination threshold in accordance with the running conditions, which prevents erroneous determination of rapid deceleration.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 2A shows the arrangement of a pump impeller and a turbine runner, and FIG. 2B shows oil flow in the torque converter;

FIG. 3A is a cross sectional view of the torque converter with the lock-up clutch disengaged, and FIG. 3B is a cross sectional view of the torque converter with the lock-up clutch engaged;

FIG. 6 is a graph illustrating variations in the engine speed, the turbine rotational speed, and the output shaft rotational speed at a gear change controlled by the control device for an automatic transmission in accordance with the embodiment of the present invention.

DETAILED DESCRIPTION OF EMBODIMENTS

Figure 1:
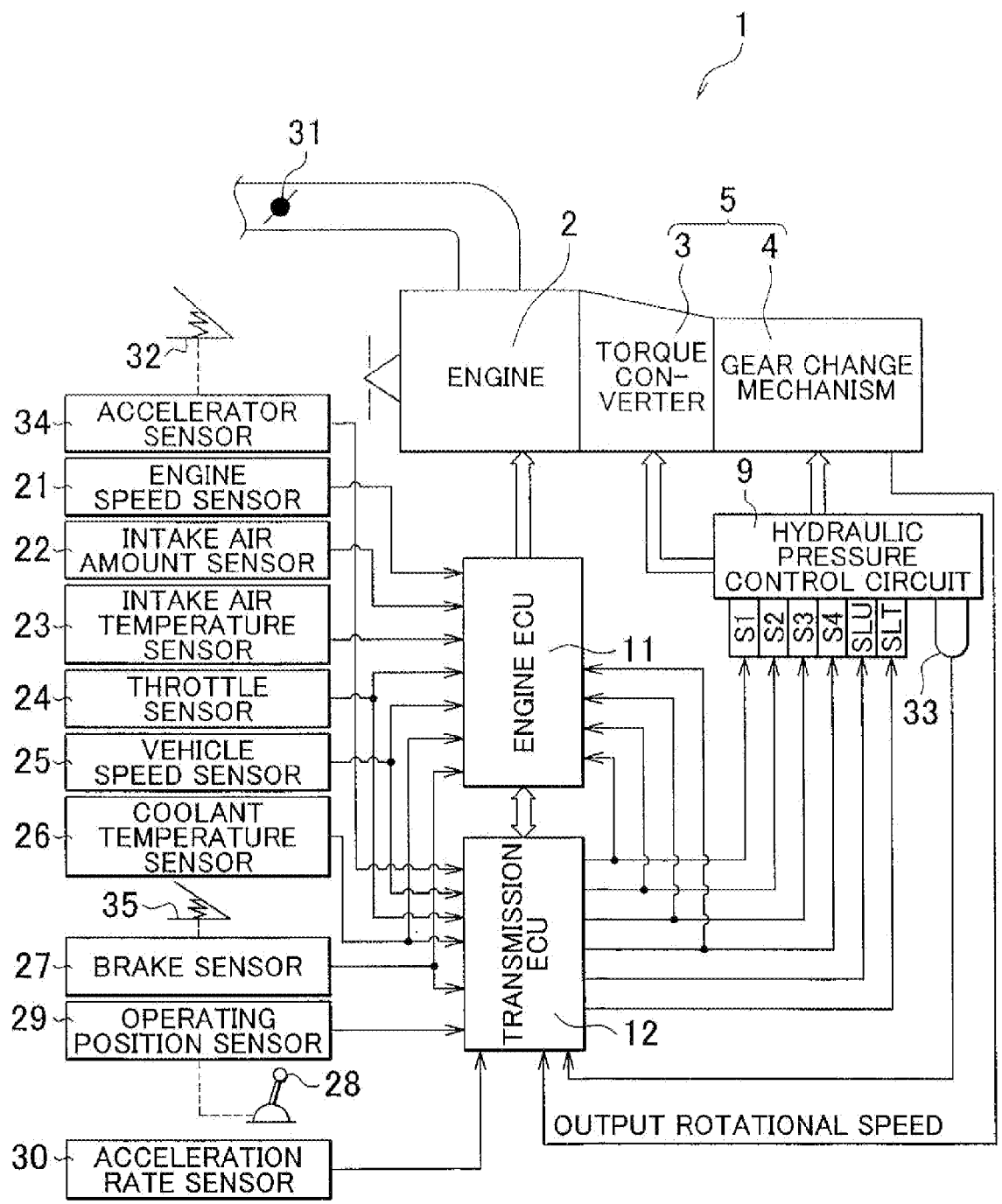
FIG. 1 is a general block diagram schematically illustrating essential components of a vehicle on which a control device for an automatic transmission in accordance with an embodiment of the present invention is mounted.

FIG. 1 is a general block diagram schematically illustrating essential components of a vehicle on which a control device for an automatic transmission in accordance with an embodiment of the present invention is mounted.

As shown in FIG. 1, a vehicle 1 includes an engine 2 as a source of motive power, a torque converter 3 that transmits torque output from the engine 2) and a gear change mechanism 4 that changes the rotational speed of an output shaft of the torque converter 3. The torque output from the gear change mechanism 4 is transmitted via a differential gear (not shown) to a driving wheel.

The engine 2 is a known power unit that burns fuel such as gasoline or light oil to output power. The torque converter 3 and the gear change mechanism 4 compose an automatic transmission 5. The torque converter 3 and the gear change mechanism 4 will be described in detail later.

The vehicle 1 further includes an engine speed sensor 21 that detects the rotational speed of the engine 2, an intake air amount sensor 22 that detects the amount of intake air for the engine 2, an intake air temperature sensor 23 that detects the temperature of the intake air for the engine 2, a throttle sensor 24 that senses the opening degree of a throttle valve 31, a vehicle speed sensor 25 that detects the vehicle speed based on the rotational speed of the driving wheel, a coolant temperature sensor 26 that detects the temperature of coolant for the engine 2, a brake pedal 35, a brake sensor 27 that detects the depression force for the brake pedal 35, a shift lever 28, an operating position sensor 29 that detects the operating position of the shift lever 28, an acceleration rate sensor 30 that detects the rate of acceleration of the vehicle 1 in transverse directions, an accelerator pedal 32, and an accelerator sensor 34 that detects the depression force for the accelerator pedal 32.

The brake sensor 27 detects changes in the master cylinder pressure or operation stroke in accordance with the depression force of an operation of the brake pedal 35 by the driver, and outputs an electrical signal to a transmission ECU 12 in accordance with the detected depression force as a brake depression force signal.

In the present invention, it is only necessary that the brake sensor 27 is able to detect the presence or the absence of an operation of the brake pedal 35 by the driver.

The accelerator sensor 34 detects changes in the master cylinder pressure or operation stroke in accordance with the depression force of an operation of the accelerator pedal 32 by the driver, and outputs an electrical signal to the transmission ECU 12 in accordance with the detected depression force as an accelerator depression force signal.

In the present invention, it is only necessary that the accelerator sensor 34 is able to detect the presence or the absence of an operation of the accelerator pedal 32 by the driver.

The vehicle 11 further includes a hydraulic pressure control circuit 9 that controls the torque converter 3 and the gear change mechanism 4, an engine electronic control unit (ECU) 11 that controls the engine 2) and a transmission electronic control unit (ECU) 12 that controls the hydraulic pressure control circuit 9.

The hydraulic pressure control circuit 9 controls the torque increase ratio of the torque converter 3 and gear shifts of the gear change mechanism 4. The hydraulic pressure control circuit 9 will be described in detail later.

The engine ECU 11 has a central processing unit (CPU), a random access memory (RAM), a read only memory (ROM), and an input/output interface (all not shown), and outputs an engine control signal to the engine 2 to control the engine 2 in accordance with the operation amount of the accelerator pedal 32.

The engine ECU 11 is connected to the engine speed sensor 21, the intake air amount sensor 22, the intake air temperature sensor 23, the throttle sensor 24, the vehicle speed sensor 25, the coolant temperature sensor 26, and the brake sensor 27, and receives signals from these sensor that indicate, respectively, the engine speed, the intake air amount, the intake air temperature, the throttle opening, the vehicle speed, the coolant temperature, and the brake depression force.

The transmission ECU 12 has a CPU, a RAM, a ROM, and an input/output interface (all not shown). The ROM stores a map containing lines defining gear changes based on the vehicle speed and the throttle opening, a program for executing gear change control, and so forth.

The ROM also stores "threshold A," "threshold B," and "threshold C" to be substituted as a threshold for use to determine a rapid deceleration. As described later, threshold A is used as the rapid deceleration determination threshold if only an accelerator operation is detected, that is, in a "power-on" running state. Threshold B is used as the rapid deceleration determination threshold when neither a brake operation nor an accelerator operation is detected, that is, in a "power-off" running state. Threshold C is used as the rapid deceleration determination threshold if only a brake operation is detected.

The term "rate of deceleration" as used in this embodiment of the present invention means a variation (decrease) in the rotational speed of an output shaft of the gear change mechanism 4, which will be described later, that is, the value obtained by subtracting a latest detection value of the rotational speed of the output shaft of the gear change mechanism 4, which is detected regularly, from a preceding detection value thereof. The term "to determine rapid deceleration" as used in this embodiment of the present invention means to determine a rapid deceleration, that is, rapid deceleration is determined when variations in the rotational speed of the output shaft of the gear change mechanism 4 exceeds the rapid deceleration determination threshold into which the "threshold A," the "threshold B," or the threshold C" is substituted.

Threshold A, threshold B, and threshold C may be stored in the RAM. In this case, a threshold change device may be provided to change the values of threshold A, threshold B, and threshold C subsequently.

The transmission ECU 12 may operate in an automatic gear change mode, in which gear change control is performed automatically based on the gear change lines, a manual gear change mode, in which gear change control is performed based on shifting commands input by the driver, or a gear change prohibition mode in which all gear changes, whether automatic or manual, are prohibited.

The transmission ECU 12 is connected with the throttle sensor 24, the vehicle speed sensor 25, the coolant temperature sensor 26, the brake sensor 27, the operating position sensor 29, the acceleration rate sensor 30, the fluid temperature sensor 33, the accelerator sensor 34, and a sensor that detects the rotational speed of the output shaft of the gear change mechanism 4 to receive signals, from these sensors, that indicate, respectively, the throttle opening amount, the vehicle speed, the coolant temperature, the brake depression force, the position of the shift lever 28, the lateral acceleration of the vehicle 1, the hydraulic fluid temperature, the accelerator depression force, and the rotational speed of the output shaft of the gear change mechanism 4.

In this embodiment, the transmission ECU 12 serves as the control device, the deceleration rate detection device, the rapid deceleration determination device, the accelerator operation detection device, the threshold setting device, and the brake operation detection device in accordance with the present invention.

Figure 2A:
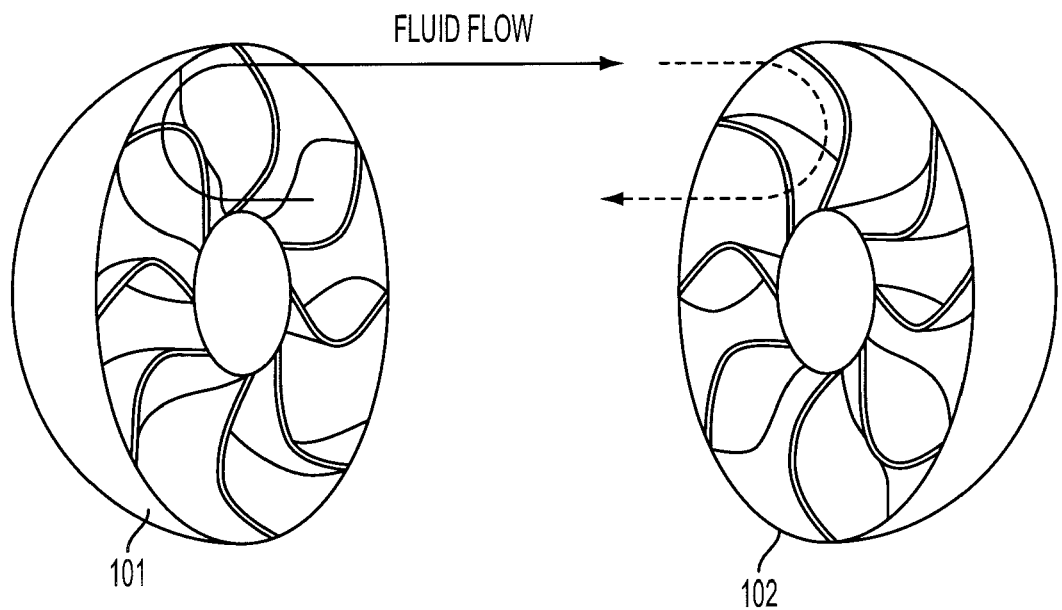
FIGS. 2A and 2B are internal schematic views of a torque converter to illustrate the principle of the torque converter, where
Figure 2B:
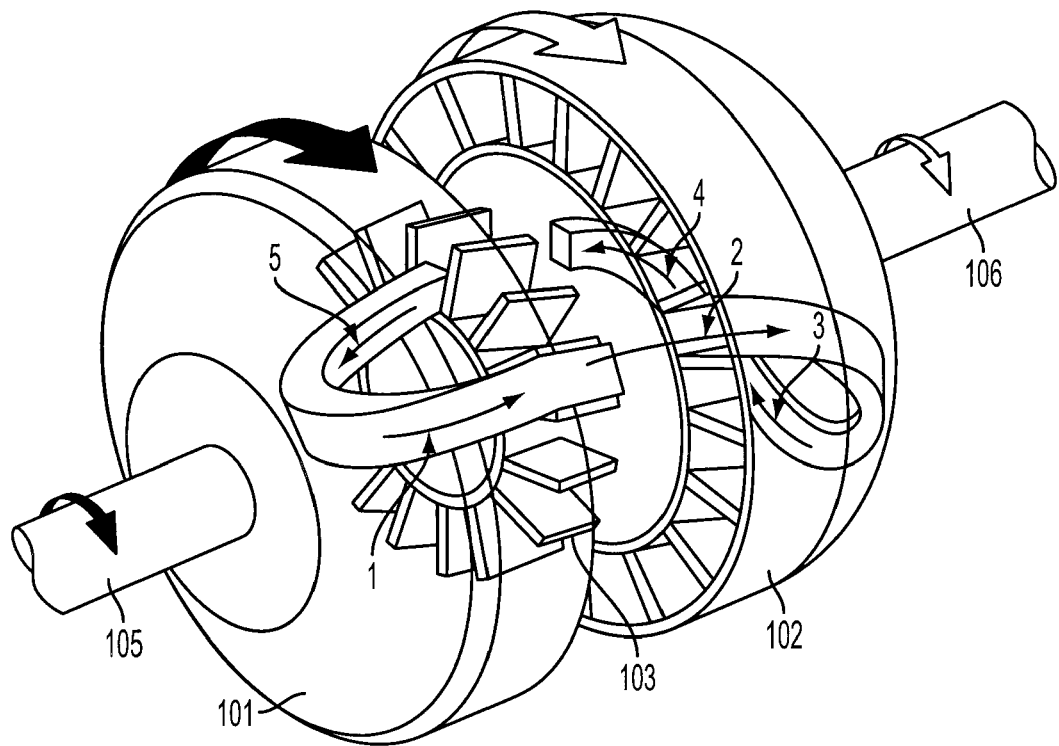

FIGS. 2A and 2B are internal schematic views of the torque converter to illustrate the principle of the torque converter. FIG. 2A shows the arrangement of a pump impeller and a turbine runner, and FIG. 2B shows oil flow in the torque converter.

The basic principle of the torque converter is as follows. A windmill is placed facing a rotary fan so that the blades of the windmill are rotated by a wind generated by rotating the rotary fan. The power not received by the windmill is circulated to serve as a tailwind for the rotary fan, rather than being lost, to increase torque. The torque converter uses a liquid in place of a gas as a medium to transmit rotation.

As shown in FIG. 2A, the torque converter includes a pump impeller 101 as the rotary fan (a blade wheel on the input side) and a turbine runner 102 as the windmill (a blade wheel on the output side), accommodated in a doughnut-shaped container (hereinafter referred to as "housing") filled with a viscous liquid such as oil (hydraulic fluid). A stator 103, which is a slightly smaller blade wheel, is disposed between them to control the direction of oil flow.

The arrows in FIG. 2B show the oil flow in the torque converter. First, (1) an engine force rotates the pump impeller 101, which forces out the oil. The oil then moves toward the outer periphery of the pump impeller 101 due to centrifugal force and flows into the turbine runner 102, along the housing. (2). The oil impinges on the blades of the turbine runner 102, which rotates the turbine runner 102. (3) The oil changes its direction to the opposite at the back surface of the turbine runner 102. (4) The oil further flows from the outer periphery toward the center of the turbine runner 102, and then toward the stator 103. At this time, the oil pushes the blades of the turbine runner 102 while changing its flowing direction, the reaction force of which rotates the turbine runner 102. (5) The oil flowing along the blades of the stator 103 flows to the back surface of the pump impeller 101 with a remaining flowing power which pushes the blades of the pump impeller 101. In this way, both the engine force and a force produced by the oil that the pump impeller 101 itself forced out, rotate the pump impeller 101, the force of which is again conducted to the turbine runner 102. This process is repeated to increase torque, although at a reduced speed.

Figure 3B:
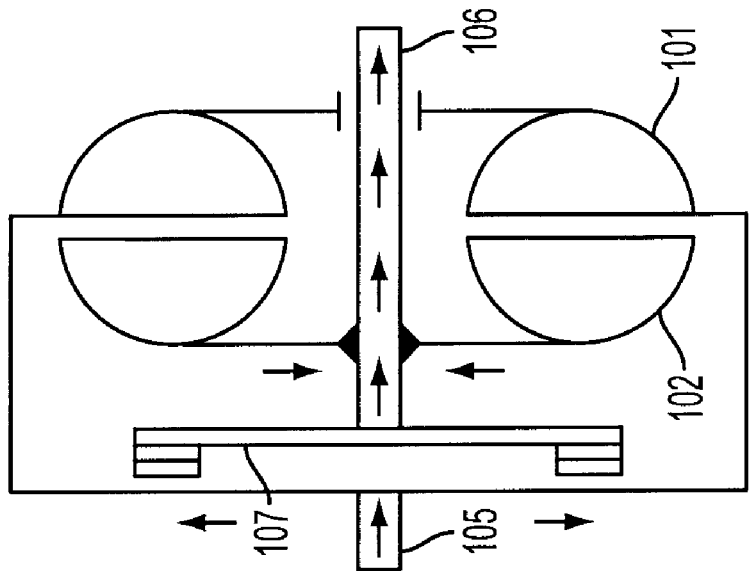
FIGS. 3A and 3B are cross sectional views schematically illustrating the torque converter to illustrate a lock-up clutch, where
Figure 3A:
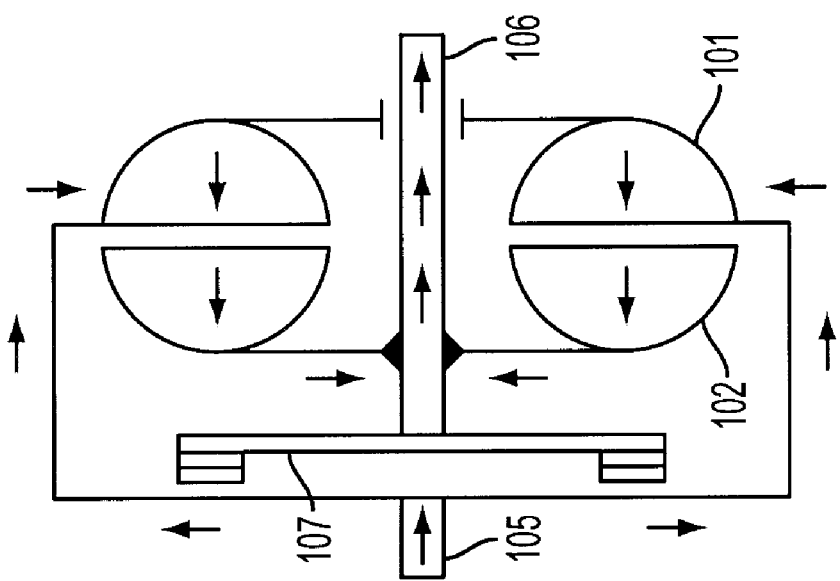

FIGS. 3A and 3B are cross sectional schematic views of the torque converter that illustrate a lock-up clutch. FIG. 3A is a cross sectional view of the torque converter with the lock-up clutch disengaged, and FIG. 3B is a cross sectional view of the torque converter with the lock-up clutch engaged.

Because the torque converter transmits rotation of the pump impeller 101 to the turbine runner 102 through oil as described above, 100% of the rotational speed, or 100% of the power, on the input side cannot be transmitted to the output side due to friction between the oil and the pump impeller 101 and the turbine runner 102, a transmission loss, and so forth. Accordingly, a lock-up mechanism to be described below is used to directly couple the input shaft with the output shaft when the rotational speed on the input side and the rotational speed on the output side are close to each other, in order to prevent energy loss by synchronizing the rotational speed on the input side with the rotational speed on the output side.

As shown in FIG. 3A, when the lock-up clutch 107 is disengaged, the rotation of an input shaft 105 of the torque converter, which has been transmitted from the engine, is transmitted to the pump impeller 101 integrally attached to the input shaft 105 as indicated by the arrows in the drawing, so that the pump impeller 101 rotates at the same rotational speed as that of the input shaft 105. The rotation of the pump impeller 101 is transmitted via the oil to the turbine runner 102, which rotates the turbine runner 102. The rotation of the turbine runner 102 is transmitted to an output shaft 106 of the torque converter integrally attached to the turbine runner 102, so that the output shaft 106 rotates at the same rotational speed as that of the turbine runner 102. However, because a transmission loss occurs when the rotation of the pump impeller 101 is transmitted to the turbine runner 102 to hinder transmission of 100% of the power, the rotational speed of the output shaft 106 is lower than the rotational speed of the input shaft 105.

Accordingly, as shown in FIG. 3B, the lock-up clutch 107 directly connects the input shaft 105 and the output shaft 106 of the torque converter to transmit 100% of the power.

When the lock-up clutch 107 is engaged, the lock-up clutch 107 directly connects the input shaft 105 and the output shaft 106 of the torque converter. Thus, as indicated by the arrows in the drawing, the rotation of the input shaft 105 of the torque converter, which has been transmitted from the engine, is directly transmitted via the lock-up clutch 107 to the output shaft 106 of the torque converter, which rotates the output shaft 106 at the same rotational speed as that of the input shaft 105. In this way, 100% of the power of the input shaft 105 can be transmitted to the output shaft 106.

Figure 4:
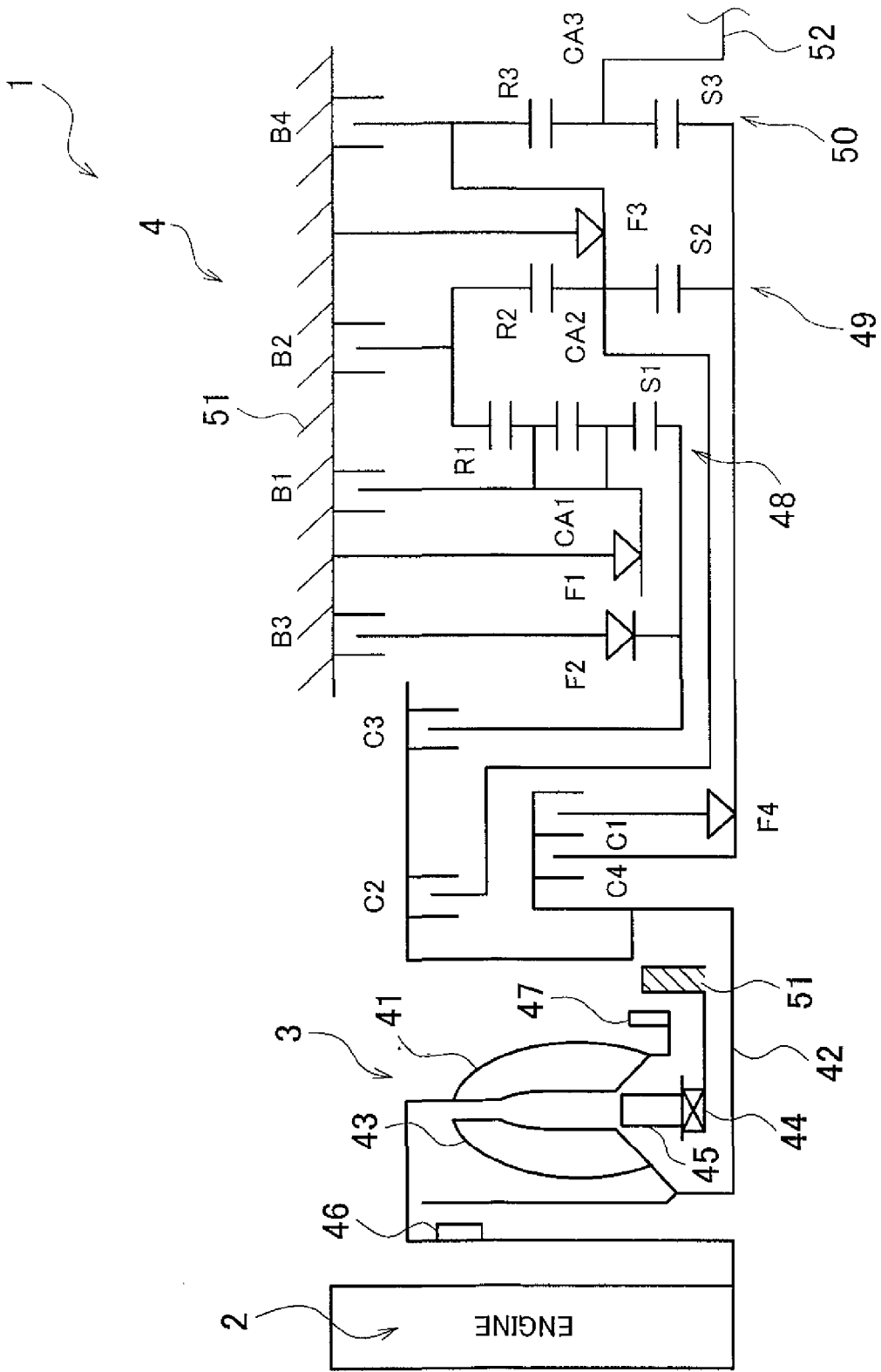
FIG. 4 is a skeleton diagram illustrating the configuration of the control device for an automatic transmission in accordance with the embodiment of the present invention.

FIG. 4 is a skeleton diagram illustrating the configuration of the automatic control device in accordance with the present invention. Below, the torque converter 3 and the gear change mechanism 4 in accordance with the embodiment will be described.

As shown in FIG. 4, the torque converter 3 is disposed between the engine 2 and the gear change mechanism 4. The torque converter 3 has a pump vane wheel 41 (corresponding to the pump impeller 101) coupled to the engine 2, a turbine vane wheel 43 (corresponding to the turbine runner 102) coupled to an input shaft 42 of the gear change mechanism 4, and a stator vane wheel 45 (corresponding to the stator 103) that is prevented from rotating in one direction by a one-way clutch 44. Power is transmitted hydraulically between the pump vane wheel 41 and the turbine vane wheel 43.

The torque converter 3 further includes a lock-up clutch 46 (corresponding to the lock-up clutch 107) that directly connects the pump vane wheel 41 with the turbine vane wheel 43. The lock-up clutch 46 directly physically connects the pump vane wheel 41 and the turbine vane wheel 43 through the hydraulic fluid when the vehicle 1 is traveling at high speed to increase the power transmission efficiency from the engine 2 to the gear change mechanism 4. The torque converter 3 may perform flex lock-up that allows the lock-up clutch 46 to slip at a predetermined slip ratio.

The pump vane wheel 41 is provided with a mechanical oil pump 47 that generates hydraulic pressure for gear change control of the gear change mechanism 4 and hydraulic pressure for supplying a lubricant to various parts.

The gear change mechanism 4 includes a first planetary gear train 48 of a double pinion type, and a second planetary gear train 49 and a third planetary gear train 50 of a single pinion type. The sun gear S1 of the first planetary gear train 48 is selectively coupled to the input shaft 42 via a clutch C3, and selectively coupled to a housing 51 via a one-way clutch F2 and a brake B3. The sun gear S1 is thus prohibited from rotating in the direction opposite the rotational direction of the input shaft 42 (hereinafter referred to as "opposite direction").

A carrier CA1 of the first planetary gear train 48 is selectively coupled to the housing 51 via a brake B1. A one-way clutch F1, provided in parallel with the brake B1, prevents the carrier CA1 from rotating in the opposite direction at all times.

A ring gear R1 of the first planetary gear train 48 is coupled to a ring gear R2 of the second planetary gear train 49, and selectively coupled to the housing 51 via a brake B2. A sun gear S2 of the second planetary gear train 49 is coupled to a sun gear S3 of the third planetary gear train 50, and selectively coupled to the input shaft 42 via a clutch C4. The sun gear S2 is also selectively coupled to the input shaft 42 via a one-way clutch F4 and a clutch C1, and thus prevented from rotating in the opposite direction.

A carrier CA2 of the second planetary gear train 49 is coupled to a ring gear R3 of the third planetary gear train 50, selectively coupled to the input shaft 42 via a clutch C2, and selectively coupled to the housing 51 via a brake B4. A one-way clutch F3, provided in parallel with the brake B4, prevents the carrier CA2 from rotating in the opposite direction. A carrier CA3 of the third planetary gear train 50 is coupled to an output shaft 52.

The clutches C1 to C4 and the brakes B1 to B4 (hereinafter simply referred to as "clutch C" and "brake B" where appropriate) each include a hydraulic friction engagement device that is controlled by a hydraulic actuator such as a multi-plate clutch or brake. The clutches C and the brakes B are actuated in response to a hydraulic circuit that is switched in accordance with the actuation of transmission solenoids S1 to S4 and linear solenoids SLU and SLT of the hydraulic pressure control circuit 9 or whether a manual valve (not shown) is actuated. Thus, the gear change mechanism 4 selects a gear according to the combination of clutches C and brakes B that are engaged and those that are disengaged. The gear change mechanism 4 in accordance with this embodiment may select any of six forward gears, namely first to sixth gears, and one reverse gear.

The hydraulic pressure control circuit 9 will be described next. The hydraulic pressure control circuit 9 includes solenoids S1 to S4, linear solenoids SLT and SLU, and a fluid temperature sensor 33 that detects the fluid temperature of the hydraulic fluid. In this embodiment, the hydraulic pressure control circuit 9 composes a lock-up control device in accordance with the present invention.

The transmission solenoid S1 is actuated when shifting from the first gear to the second gear. The transmission solenoid S2 is actuated when shifting from the second gear to the third gear and when shifting from the fifth gear to the sixth gear. The transmission solenoid S3 is actuated when shifting from the third gear to the fourth gear. The transmission solenoid S4 is actuated when shifting from the fourth gear to the fifth gear.

The linear solenoid SLT executes a line pressure control and a back pressure control for an accumulator (not shown). The linear solenoid SLU executes a lock-up mechanism control.

Friction elements of the gear change mechanism 4 are selectively actuated using the line pressure as the pressure source based on whether the transmission solenoids S1 to S4 and the linear solenoids SLT and SLU are actuated. The ratio in the rotational speed between the input shaft 42 and the output shaft 52 of the gear change mechanism 4 is changed to provide various gears according to the combination of friction elements that are engaged and those that are disengaged.

Figure 5:
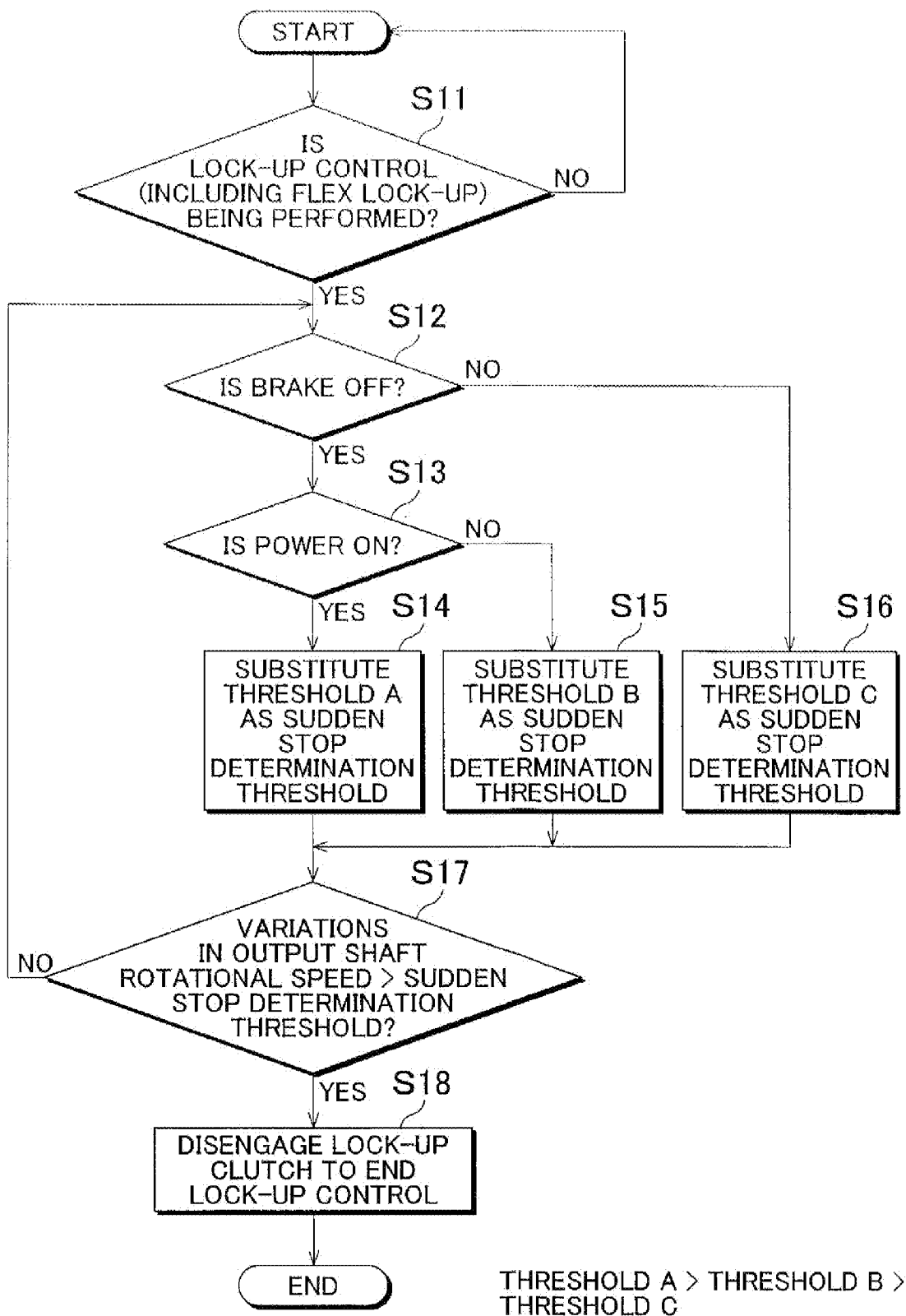
FIG. 5 is a flowchart showing the general procedure of a lock-up control program in the control device for an automatic transmission in accordance with the embodiment of the present invention.

FIG. 5 is a flowchart showing the general procedure of a lock-up control program in the automatic transmission control device in accordance with the embodiment of the present invention. The processes described below are executed by the CPU of the transmission ECU 12 at predetermined intervals to implement a program that is processed by the CPU.

First, the transmission ECU 12 determines whether lock-up control is being performed (step S11). The lock-up control may include not only a lock-up control in which the output shaft of the engine 2 is directly engaged with the input shaft of the gear change mechanism 4 by the lock-up clutch, but also a flex lock-up control in which the output shaft of the engine 2 is directly engaged with the input shaft of the gear change mechanism 4 by the lock-up clutch while the lock-up clutch 46 slips at a predetermined slip ratio.

If the transmission ECU 12 determines that the lock-up control is being executed ("Yes" in step S11), the process proceeds to step S12. Alternatively, if the transmission ECU 12 determines that lock-up control is not being executed ("No" in step S11, this step is repeated.

Then, the transmission ECU 12 determines whether the brake is "off" (step S12. Specifically, the transmission ECU 12 determines whether the brake is "off" based on whether a brake depression force signal is received from the brake sensor 27.

If the transmission ECU 12 does not receive a brake depression force signal from the brake sensor 27, the transmission ECU 12 determines that the brake is "off," and the process proceeds to step S13. On the other hand, if the transmission ECU 12 receives a brake depression force signal from the brake sensor 27, the transmission ECU 12 determines that the brake is "on," and the process proceeds to step S16.

If the transmission ECU 12 determines that the brake is "off" ("Yes" in step S12), the transmission ECU 12 determines whether the vehicle is running in the "power-on" state (step S13). Specifically, the transmission ECU 12 determines whether the vehicle is running in the "power-on" state based on whether an accelerator depression force signal from the accelerator sensor 34 has been received.

If the transmission ECU 12 has received an accelerator depression force signal from the accelerator sensor 34, the transmission ECU 12 determines that the vehicle is running in the "power-on" state, and the process proceeds to step S14. On the other hand, if the transmission ECU 12 has not received an accelerator depression force signal from the accelerator sensor 34, the transmission ECU 12 determines that the vehicle is running in the "power-off" state, and the process proceeds to step S15.

If the transmission ECU 12 determines the power-on state ("Yes" in step S13), the transmission ECU 12 sets threshold A as the rapid deceleration determination threshold. However, if the transmission ECU 12 determines the power-off state ("No" in step S13), the transmission ECU 12 sets threshold B as the rapid deceleration determination threshold.

On the other hand, if the transmission ECU 12 determines that the brake is "on" ("No" in step S12), the transmission ECU 12 sets threshold C as the rapid deceleration determination threshold. Threshold A, threshold B, and threshold C satisfy the following relationship: threshold A>threshold B>threshold C. That is, threshold A, which is used as the rapid deceleration determination threshold in the "power-on" state, is the highest threshold, and the threshold C, which is used as the rapid deceleration determination threshold in the brake "on" state, is the lowest threshold.

Then, the transmission ECU 12 determines whether variations in the rotational speed of the output shaft of the gear change mechanism 4, which are detected by an output shaft rotational speed sensor (not shown) provided for the output shaft of the gear change mechanism 4, exceed the rapid deceleration determination threshold (step S17). The transmission ECU 12 determines the variations in the rotational speed of the output shaft of the gear change mechanism 4 based on the detected rotational speed of the output shaft that is regularly input from the gear change mechanism 4, by subtracting the latest output shaft rotational speed from a preceding output shaft rotational speed.

If the transmission ECU 12 determines that variations in the rotational speed of the output shaft of the gear change mechanism 4 do not exceed the rapid deceleration determination threshold ("No" in step S17), the process proceeds to S12 and repeats the above processes (step S12 to step S17).

On the other hand, if the transmission ECU 12 determines that variations in the output shaft rotational speed exceed the rapid deceleration determination threshold ("Yes" in step S17), the lock-up clutch is disengaged and the lock-up control is ended (step S18), which ends the process.

Thus, when the brake is "off," or if a brake signal cannot be detected in the event of a failure of the brake sensor 27 or the like, the rapid deceleration determination thresholds selected based on whether the accelerator pedal 32 is depressed. Therefore, it is possible to be consistent with driver's intention, and to avoid inappropriately determining that the vehicle is rapidly decelerating.

FIG. 6 is a graph illustrating variations in the engine speed, the turbine rotational speed, and the output shaft rotational speed at a gear change controlled by the control device for an automatic transmission in accordance with the embodiment of the present invention.

In the graph shown in FIG. 6, the transmission shifts from the third gear to the second gear at 500 ms during a lock-up control, as indicated by the gear change output. Along with the shift, the transmission ECU 12 causes the hydraulic pressure control circuit 9 to switch from actuating the transmission solenoid S2 to actuating the transmission solenoid S1. The hydraulic pressure control circuit 9 switches from actuating the transmission solenoid S2 to actuating the transmission solenoid S1 under control of the transmission ECU 12 to actually change from the third gear to the second gear by controlling the hydraulic pressure of the gear change mechanism 4. At this time, the transmission ECU 12 also sends a gear change signal to the engine ECU 11 to cause the engine ECU 11 to increase the rotational speed of the engine 2 at the same time. This allows the engine speed and the turbine rotational speed to be increased around 700 ms to 1000 ms. The delay between the actual gear change (500 ms) and the start of the increase in the engine speed and the turbine rotational speed (700 ms) occurs because the hydraulic pressure is decreased by the operation of the transmission solenoid S2 and the hydraulic pressure is gradually increased by the operation of the transmission solenoid S1.

Variations in the rotational speed of the output shaft of the gear change mechanism 4 occur around 550 ms to 1000 ms due to the hydraulic pressure control, the engine speed and the turbine rotational speed, and the vehicle speed subjected to the inertial force of the vehicle 1.

When threshold C is set as the rapid deceleration determination threshold, variation "X" in the rotational speed of the output shaft around 800 ms exceeds threshold C. Therefore, the lock-up clutch is disengaged, regardless of the running condition.

In the control device for an automatic transmission of the present invention, however, threshold A is used as the rapid deceleration determination threshold in the "power-on" running state, for example. Therefore, variation "X" in the rotational speed of the output shaft of the gear change mechanism 4 is less than the "threshold A," and it is determined that the vehicle is not rapidly decelerating. As a result, the SLU command pressure is kept at its maximum, and the lock-up clutch is not disengaged (in the drawing, the SLU command pressure is kept constant at its maximum). That is, because the lock-up control is maintained, the lock-up clutch is not inappropriately disengaged.

As has been described above, in the automatic transmission control device in accordance with the embodiment of the present invention, it is determined that the vehicle is rapidly decelerating when variations in the rotational speed of the output shaft of the gear change mechanism 4 are equal to or exceed threshold A when the vehicle is in the power-on state, and it is determined that the vehicle is rapidly decelerating when variations in the rotational speed of the output shaft of the gear change mechanism 4 are equal to or exceed threshold B, which is lower than threshold A, when the vehicle is in the power-off state. Therefore, it is possible to be consistent with driver's intention) and to avoid inappropriately determining that the vehicle is rapidly decelerating, by changing the rapid deceleration determination threshold in accordance with running conditions.

Because the actuation of the lock-up clutch is controlled based on the results of determining rapid deceleration, the lock-up clutch may be actuated in accordance with running conditions, and inappropriate disengagement of the lock-up clutch is avoided.

Because threshold C, which is the lowest threshold, is used to determine whether the vehicle is rapidly decelerating when a brake operation is detected, the presence or the absence of a brake operation, which is highly likely if the vehicle is being rapidly decelerated, may be reflected in the determination. That is, rapid deceleration of the vehicle may be determined at smaller variations in the rotational speed of the output shaft of the gear change mechanism 4 during a brake operation, thereby allowing the rapid deceleration of the vehicle to be more precisely determined.

In the above embodiment, three rapid deceleration determination thresholds are used to determine whether the vehicle is rapidly decelerating based on whether the brakes and the accelerator are operated. However, the present invention is not limited thereto, and a larger number of rapid deceleration determination thresholds may be provided as appropriate based on other determination criteria. In addition, the effects similar to those of the above automatic transmission control device are obtained.

In the above embodiment, the rapid deceleration determination thresholds are selected based only on whether the brake operation is "on" or "off". However, the present invention is not limited thereto, and the rapid deceleration determination thresholds may alternatively be selected based on the magnitude of the brake depression force. Also in this case, the effects similar to those of the above control device for an automatic transmission can be obtained.

Likewise, the rapid deceleration determination thresholds are selected based on whether the accelerator operation is "on" or "off". However, the present invention is not limited thereto, and the rapid deceleration determination thresholds may also be selected based on the magnitude of the accelerator depression force. Also in this case, the effects similar to those of the above control device for an automatic transmission can be obtained.

In the above embodiment, the same control is performed during the lock-up control, in which the lock-up clutch is fully engaged, and during the flex lock-up control. However, the present invention is not limited thereto, and different controls may be performed during full lock-up and during flex lock-up to provide separate rapid deceleration determination thresholds. Also in this case, the effects similar to those of the above automatic transmission control device can be obtained.

In the above embodiment, threshold A, threshold B, and threshold C, used as the rapid deceleration determination thresholds, are fixed values. However, the present invention is not limited thereto, and the thresholds may vary in accordance with running conditions of the vehicle 1, such as the vehicle speed and the rate of acceleration of the vehicle 1. Also in this case, the effects similar to those of the above automatic transmission control device can be obtained.

As described above, the automatic transmission control device in accordance with the present invention uses different thresholds to determine the rate of deceleration based on whether the vehicle is in the power-on state, in such a manner that it is determined that whether the vehicle is rapidly decelerating using a first threshold if traveling in the power-on state, and using a second threshold, which is lower than the first threshold, if traveling in the power-off state. Therefore, it is possible to be consistent with driver's intention, and to avoid inappropriately determining that the vehicle is decelerating, by selecting a different rapid deceleration determination threshold in accordance with running conditions. The control device for an automatic transmission in accordance with the present invention is thus useful to prevent in appropriate disengagement of a lock-up clutch.

What is claimed is:

1. An automatic transmission control device that determines whether a vehicle is rapidly decelerating based on a rate of deceleration of the vehicle, comprising:
    a deceleration rate detection device that detects the rate of deceleration of the vehicle;
    a rapid deceleration determination device that determines that the vehicle is rapidly decelerating if the detected rate of deceleration is equal to or exceeds a predetermined threshold;
    an accelerator operation detection device that detects presence or absence of an accelerator operation for the vehicle; and
    a threshold setting device that sets a first threshold if it is determined that the vehicle is in a power-on state, in which the accelerator operation detection device has detected the accelerator operation, and sets a second threshold, which is lower than the first threshold, if it is determined that the vehicle is not in the power-on state, wherein
    the rapid deceleration determination device determines that the vehicle is rapidly decelerating if the detected rate of deceleration detected by the deceleration rate detection device is equal to or exceeds one of the thresholds set by the threshold setting device.

2. The automatic transmission control device according to claim 1, further comprising:
    a fluid joint that converts a rotational force of an output shaft of an engine into a rotational force of an input shaft of a gear change mechanism that changes a gear ratio; and
    an engagement control device that engages the output shaft of the engine with the input shaft of the gear change mechanism through an engagement device either directly or with predetermined slipping, wherein
    the engagement control device releases engagement by the engagement device only if the rapid deceleration determination device determines that the vehicle is rapidly decelerating when the output shaft of the engine is engaged with the input shaft of the gear change mechanism.

3. The automatic transmission control device according to claim 1, further comprising:
    a brake operation detection device that detects presence or absence of a brake operation for the vehicle, wherein
    the threshold setting device sets a third threshold, which is lower than the first threshold and the second threshold, if the brake operation is detected by the brake operation detection device.

4. The automatic transmission control device according to claim 3, wherein
    the brake operation detection device detects a magnitude of a brake depression force for the vehicle;
    the threshold setting device changes the third threshold in accordance with the detected magnitude of the brake depression force detected by the brake operation detection device if the brake operation is detected; and
    the rapid deceleration determination device determines whether the vehicle is rapidly accelerating according to the changed threshold.

5. The automatic transmission control device according to claim 1, wherein
    the accelerator operation detection device detects a magnitude of an accelerator depression force for the vehicle;
    the threshold setting device changes the first threshold in accordance with the detected magnitude of the accelerator depression force detected by the accelerator operation detection device if it is determined that the vehicle is in the power-on state; and
    the rapid deceleration determination device determines whether the vehicle is rapidly decelerating according to the changed threshold.

* * * * *